United States Patent
Ozawa et al.

(10) Patent No.: US 8,905,202 B2
(45) Date of Patent: Dec. 9, 2014

(54) BRAKE DRUM

(75) Inventors: Shingo Ozawa, Chino (JP); Takahiro Nobe, Tokyo (JP)

(73) Assignees: TPR Co., Ltd. (JP); TPR Industry Co., Ltd. (JP)

( * ) Notice: Subject to any disclaimer, the term of this patent is extended or adjusted under 35 U.S.C. 154(b) by 1 day.

(21) Appl. No.: 13/413,224

(22) Filed: Mar. 6, 2012

(65) Prior Publication Data

US 2012/0228068 A1    Sep. 13, 2012

(30) Foreign Application Priority Data

Mar. 7, 2011 (JP) ................. 2011-048822

(51) Int. Cl.
*F16D 65/10* (2006.01)
*F16D 65/827* (2006.01)

(52) U.S. Cl.
CPC ........ *F16D 65/10* (2013.01); *F16D 2200/0021* (2013.01); *F16D 2200/003* (2013.01); *F16D 2250/0007* (2013.01); *F16D 65/827* (2013.01); *F16D 2200/0013* (2013.01); *F16D 2200/0004* (2013.01)
USPC .................................... 188/218 R

(58) Field of Classification Search
CPC .............. F16D 65/10; F16D 2065/134; F16D 2065/1304; F16D 2065/1372
USPC ............................. 188/218 R, 242
See application file for complete search history.

(56) References Cited

U.S. PATENT DOCUMENTS

| | | | | |
|---|---|---|---|---|
| 1,927,306 A | * | 9/1933 | Campbell | 188/218 R |
| 1,947,091 A | * | 2/1934 | Keller | 188/218 R |
| 1,989,211 A | * | 1/1935 | Norton | 188/218 R |
| 2,042,654 A | * | 6/1936 | Dostal | 188/218 R |
| 2,173,591 A | * | 9/1939 | Miller et al. | 188/218 R |
| 3,888,296 A | | 6/1975 | Vernia et al. | |
| 2004/0026189 A1 | | 2/2004 | Koike et al. | |

FOREIGN PATENT DOCUMENTS

| | | | |
|---|---|---|---|
| JP | 4-80938 | | 7/1992 |
| JP | 05187466 A | * | 7/1993 |
| JP | 11-336803 | | 12/1999 |
| JP | 11336803 A | * | 12/1999 |
| JP | 2003-301873 | | 10/2003 |
| JP | 2004-84889 | | 3/2004 |
| JP | 2004-92902 | | 3/2004 |
| JP | 2005-194983 | | 7/2005 |

(Continued)

OTHER PUBLICATIONS

European Search Report for European Application No. 12154919.0 mailed Jun. 18, 2012.

(Continued)

*Primary Examiner* — Thomas J Williams
(74) *Attorney, Agent, or Firm* — Merchant & Gould P.C.

(57) ABSTRACT

A brake drum which can improve the drag strength, strength and rigidity in the diametrical direction, joint strength, and heat radiating ability, that is, a brake drum which is used for a drum brake, wherein the drum has a plurality of the projections at the outer circumferential surface, the plurality of the projections are formed at the outer circumferential surface as a whole when casting a brake drum, and at least part of the projections have thin-waisted shapes. A height of the projections is 0.3 to 5.0 mm, while the number of projections is 5 to 100/cm². The brake drum is produced by centrifugal casting.

5 Claims, 3 Drawing Sheets

(56) References Cited

FOREIGN PATENT DOCUMENTS

| JP | 2009-264347 | 11/2009 |
|---|---|---|
| JP | 2010-133424 | 6/2010 |
| JP | 2010-159768 | 7/2010 |

OTHER PUBLICATIONS

Japanese Office Action from corresponding JP Application No. 2011-048822 dated Aug. 13, 2014.

* cited by examiner

BRAKE DRUM

This application claims benefit of Serial No. 2011-048822, filed 7 Mar. 2011 in Japan and which application is incorporated herein by reference. To the extent appropriate, a claim of priority is made to the above disclosed application.

BACKGROUND OF THE INVENTION

1. Field of the Invention

The present invention relates to a brake drum used for a drum brake of an automobile or motorcycle.

2. Description of the Related Art

As a brake drum, for example there is the one shown in Japanese Patent Publication (A) No. 2004-084889. Fine relief shapes are formed at the outer circumferential surface of the brake drum so as to increase the surface area and thereby improve the heat radiating ability and efficiently conduct heat generated at the brake drum from the fine relief shapes to a wheel hub.

As related art, there is Japanese Patent Publication (A) No. 2004-084889.

However, in the brake drum shown in Japanese Patent Publication (A) No. 2004-084889, fine relief shapes are formed at the outer circumferential surface, but shot blasting is used to form the relief shapes, so the drag strength in the rotational direction is not sufficient. Further, the rigidity in the diametrical direction is not sufficient, so sometimes the vibration caused by friction with the brake shoe causes abnormal noise.

SUMMARY OF THE INVENTION

An object of the present invention is to provide a brake drum which can be improved in drag strength, strength and rigidity in the diametrical direction, joint strength, and heat radiating ability.

The present invention provides a brake drum which is used for a drum brake, wherein the drum has a plurality of the projections at the outer circumferential surface, the plurality of the projections are formed at the outer circumferential surface as a whole when casting a brake drum, and at least part of the projections have thin-waisted shapes.

The height of the projections is preferably 0.3 to 5.0 mm, while the number of projections is preferably 5 to 100/cm$^2$.

The brake drum is preferably made by cast iron, cast steel, or aluminum alloy.

The brake drum is preferably produced by centrifugal casting.

The brake drum is attached by insert casting to a member comprised of for example aluminum alloy or magnesium alloy.

According to the brake drum of the present invention, the entire outer circumferential surface has a plurality of the projections, so the drag strength and heat radiating ability are improved. Further, the strength and rigidity in the diametrical direction are improved and abnormal noise is reduced. Further, by making part or all of the projections thin-waisted projections, the drag strength and joint strength are improved and greater thinness becomes possible.

BRIEF DESCRIPTION OF DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
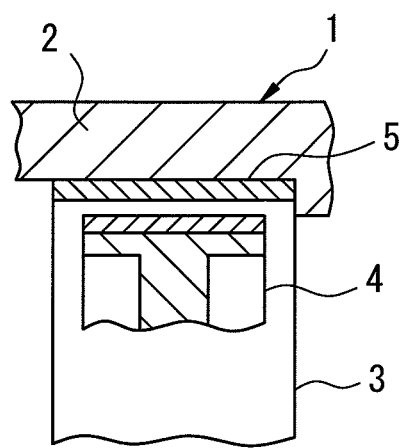
FIG. 1 is a longitudinal cross-sectional view of an embodiment of the present invention.

Below, preferred embodiments of the present invention will be explained while referring to the drawings.

FIG. 1 shows a drum brake. At the inner circumferential surface of a cylindrically shaped drum part 2 of a wheel 1, a brake drum 3 is attached by insert casting. The wheel 1 is comprised of aluminum alloy or magnesium alloy, while the brake drum 3 is formed by cast iron, cast steel, or an aluminum alloy. Reference numeral 4 is a brake shoe having the action of being pressed against the inner circumference of the brake drum 3.

Figure 2:
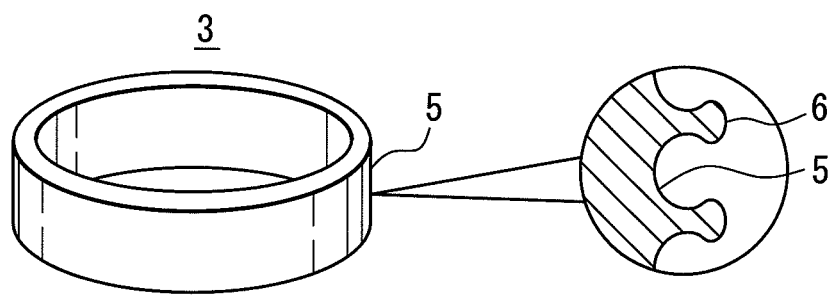
FIG. 2 is a perspective view of a brake drum.

At the outer circumferential surface 5 of the cylindrically shaped brake drum 3 (see FIG. 2), a plurality of projections 6 are formed over the entire area. Among these projections 6, part or all of the projections 6 have thin-waisted shapes. The height of the projections 6 is 0.3 to 5.0 mm, while the number of the projections 6 is 5 to 100/cm$^2$.

If the height of the projections 6 is less than 0.3 mm, the drag strength in the rotational direction becomes insufficient, while if over 5.0 mm, the effect of reduction of thickness is lost. If the number of the projections 6 is less than 5/cm$^2$, the drag strength in the rotational direction becomes insufficient, while if over 100/cm$^2$, the castability becomes poor.

The brake drum 3 is produced by centrifugal casting. Below, the method of production of the brake drum 3 will be explained.

Diatomaceous earth, bentonite (binder), water, and a surfactant are mixed in a predetermined ratio to prepare a mold wash. The mold wash is spray coated on the inside surface of a casting mold (mold) which is heated to 200 to 400° C. and rotates whereby a mold wash layer is formed on the inside surface of the casting mold. Due to the action of the surfactant, a plurality of recessed holes are formed in the mold wash layer due to the bubbles of the gas produced from the inside of the mold wash layer. The mold wash layer is dried, then metal melt is cast into the rotating casting mold. At this time, the melt fills the recessed holes of the mold wash layer whereby a plurality of uniform projections are formed. The melt hardens to form the brake drum, then the brake drum is taken out from the casting mold together with the mold wash layer. This is then blasted to remove the mold wash whereby a brake drum which has a plurality of projections, at least part of which projections have a thin-waisted shape, over its entire outer circumferential surface is produced.

Figure 3:
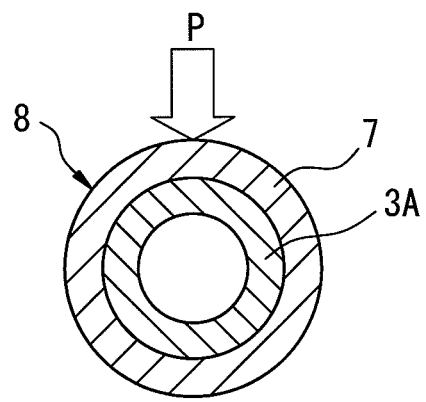
FIG. 3 is a schematic view of a compression test.
Figure 5:
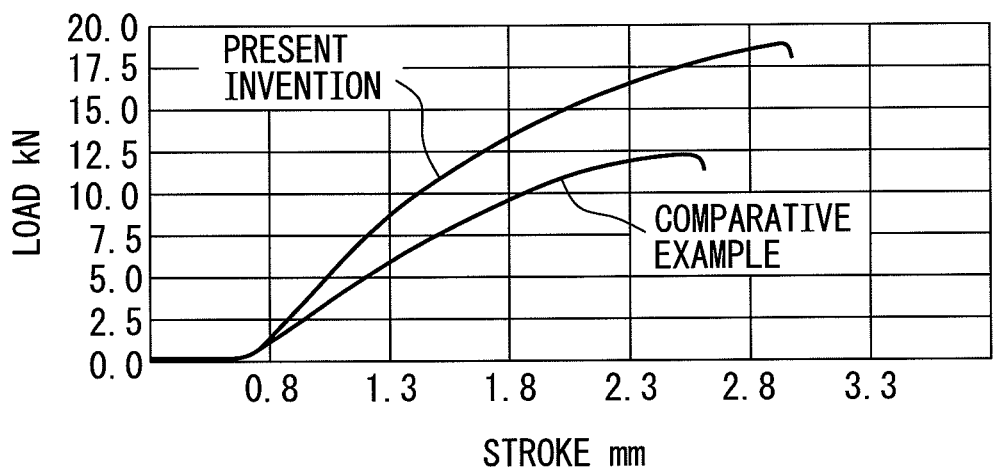
FIG. 5 is a graph showing the test results of the compression test.

FIG. 5 is a view showing the relationship between the load and stroke (displacement) when applying a compressive load to a test piece by a universal tensile/compression tester. FIG. 3 is a schematic view of a compression test. A test piece 8 formed by insert casting a brake drum 3A, made of cast iron and forming a cylindrical shape, at an inner circumference of a cylindrical member 7 made of aluminum alloy is measured for displacement-load up to fracture when applying a compressive load P from above by a load test machine. The pushing speed was 3 mm/min.

The brake drum of the present invention used in the test had a height of projections of 0.6 to 0.75 mm and a number of projections of 10 to 29/cm$^2$, while the brake drum of the comparative example was not formed with projections at its outer circumferential surface, had a maximum height Ry of relief shapes of the surface roughness of 100 to 250 μm, and had an average distance Sm of relief shapes of 0.7 to 1.4 mm.

As shown in FIG. 5, the compressive load is about 1.3 to 1.4 times higher in the present invention than the comparative example at displacements of 1.3 mm, 1.8 mm, and 2.3 mm. Further, the fracture load is about 19 kN in the present invention and about 12.5 kN in the comparative example. The present invention has a fracture load about 1.5 times higher than the comparative example.

Figure 4:
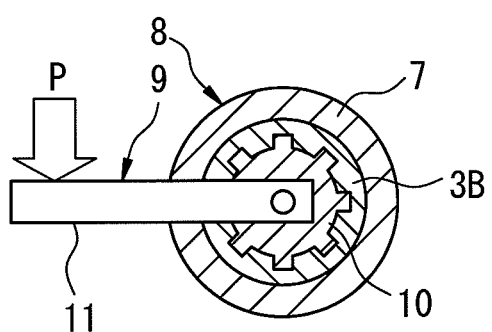
FIG. 4 is a schematic view of a drag strength test.
Figure 6:
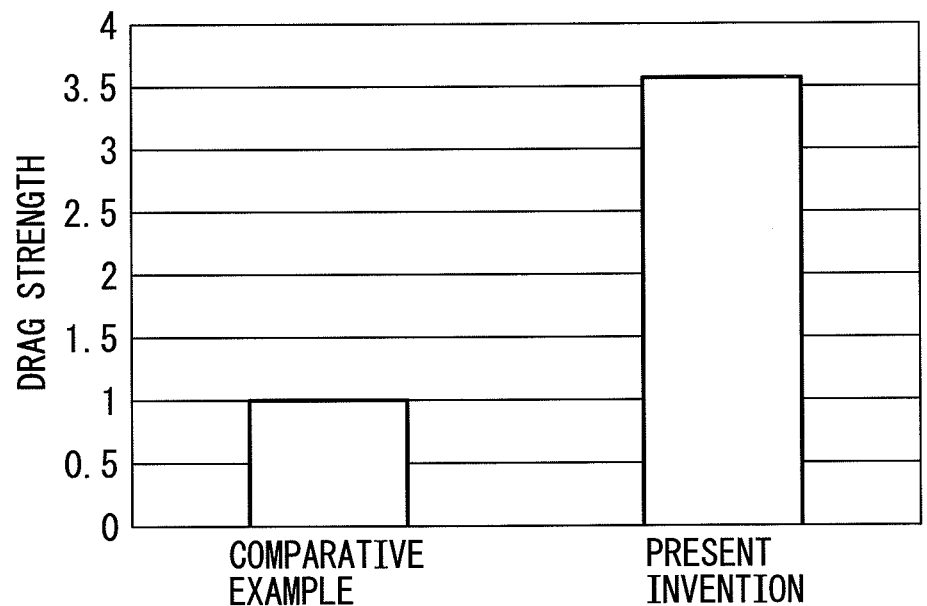
FIG. 6 is a graph showing the test results of the drag strength test.

FIG. 6 is a view showing the test results of the drag strength when applying a load to a test piece by a universal tensile/compression tester and twisting in the rotational direction. FIG. 4 is a schematic view of a drag strength test. The test piece 8 was formed by insert casting a brake drum 3B made of cast iron and forming a cylindrical shape at an inner circumference of a cylindrical member 7 made of aluminum alloy. At the inner circumference of the brake drum 3B, a plurality of recesses are formed at intervals in the peripheral direction. The fixture 9 to which the test piece 8 is attached has a main body 10 attached to the inner circumference of the brake drum 3B of the test piece 8. At the outer circumference of the main body 10, a plurality of teeth are formed while fit into the recesses of the inner circumference of the brake drum 3B. The fixture 9 has an arm 11 which is fastened to the center part of the side surface of the main body 10 and extends to the side.

The test piece 8 is set at the main body 10 of the fixture 9. Note that, a thin sleeve (not shown) is inserted into the clearance between the inner circumference of the brake drum 3B of the test piece 8 and the outer circumference of the main body 10 of the fixture 9. The test piece 8 is measured for load kg-m (drag strength) when applying a load P from above to the arm 11 (arm length 200 mm) of the fixture 9 by a load test machine in the fastened state and twisting the test piece 8 in the rotational direction. The pushing speed was 6 mm/min.

The brake drum of the present invention used in the above test has a height of projections of 0.6 to 0.75 mm and a number of projections of 10 to 29/cm$^2$. The brake drum of the comparative example is not formed with projections over the outer circumferential surface. The maximum height Ry of the relief shapes of the surface roughness was 100 to 250 μm, while the average distance Sm between relief shapes was 0.7 to 1.4 mm.

FIG. 6 shows the relative values when indexed to the drag strength of the comparative example as "1". As shown in FIG. 6, it is learned that the drag strength of the present invention is about 3.5 times higher than the comparative example.

While the invention has been described with reference to specific embodiments chosen for purpose of illustration, it should be apparent that numerous modifications could be made thereto by those skilled in the art without departing from the basic concept and scope of the invention.

The invention claimed is:

1. A brake drum which is used for a drum brake, wherein the brake drum has a plurality of projections at the outer circumferential surface of the brake drum said plurality of the projections are formed at the outer circumferential surface as a whole when casting a brake drum, and at least part of the projections have thin-waisted shapes such that said at least part of the projections have a substantially domed tip part distal to the outer circumferential surface, a base part proximal to the outer circumferential surface, and a middle part located between the domed tip part and the base part and having a thinnest portion of the projection,
    wherein the middle part is gradually thinner toward the outer circumferential surface from a thickest portion of the domed tip part to the thinnest portion of the projection and gradually thicker toward the outer circumferential surface from the thinnest portion of the projection to a lowest middle portion, the lowest middle portion having a thickness equal to a thickness of the thickest portion of the domed tip part to define the thin-waisted shapes, and
    wherein the base part is gradually thicker from the lowest middle portion to the outer circumferential surface.

2. The brake drum as set forth in claim 1, wherein a height of the projections is 0.3 to 5.0 mm, while the number of projections is 5 to 100/cm$^2$.

3. The brake drum as set forth in claim 1, wherein said brake drum is made by cast iron, cast steel.

4. The brake drum as set forth in claim 1, wherein said brake drum is attached by insert casting to a member comprised of aluminum alloy or magnesium alloy.

5. The brake drum as set forth in claim 1, wherein the at least part of the projections have a shape formed by using a mold having a plurality of recessed holes, the plurality of recessed hole formed by bubbles of gas produced from an inside of a mold wash layer.

\* \* \* \* \*